United States Patent [19]
Kasaki

[11] Patent Number: 5,201,031
[45] Date of Patent: Apr. 6, 1993

[54] PRINTER USING EXTERNAL FONT CARTRIDGE

[75] Inventor: Nobuhiro Kasaki, Tokyo, Japan

[73] Assignee: NEC Corporation, Tokyo, Japan

[21] Appl. No.: 854,815

[22] Filed: Mar. 19, 1992

[30] Foreign Application Priority Data

Mar. 22, 1991 [JP] Japan .................................. 3-57565

[51] Int. Cl.[5] .......................................... G06K 15/00
[52] U.S. Cl. ...................................... 395/110; 375/115
[58] Field of Search ............... 395/110, 115, 112, 114, 395/101, 164, 165, 166, 500, 425; 346/154; 400/69, 61, 62, 72, 70; 358/444, 404

[56] References Cited

U.S. PATENT DOCUMENTS

| | | | |
|---|---|---|---|
| 3,480,943 | 11/1969 | Manber | 340/324 |
| 4,715,006 | 12/1987 | Nagata | 395/110 |
| 4,763,281 | 8/1988 | Arakawa | 395/110 |
| 4,901,249 | 2/1990 | Shiota | 395/110 |

Primary Examiner—Arthur G. Evans
Attorney, Agent, or Firm—Foley & Lardner

[57] ABSTRACT

A printer using an external font cartridge, includes a printer main body and a cartridge. The printer main body includes an internal font data memory, a program memory, a control section, and a printing mechanical section. The internal font data memory stores internal font data. The program memory stores at least an internal font development program. The control section performs control to generate print data on the basis of the internal font data and the internal font development program. The printing mechanical section prints the print data generated by the control section. The cartridge includes an external font data memory and an external font development program memory. The external font data memory stores external font data. The external font development program memory stores an external font development program. When the cartridge is loaded into the printer main body, the control section selects the external font data memory and the external font development program memory in the cartridge, and performs control to generate print data corresponding to a designated character.

7 Claims, 3 Drawing Sheets

PRINTER USING EXTERNAL FONT CARTRIDGE

BACKGROUND OF THE INVENTION

The present invention relates to a printer and, more particularly, to a printer having a multiple font control function, which is designed to improve a method of supplying character pattern development programs inherent in the respective fonts.

As shown in FIG. 4, a conventional printer of this type has a printer main body 15 comprising a master control section 1 constituted by a CPU, a program memory (program ROM) 2, a buffer memory 3 (buffer RAM) 3, a B type font data memory (print ROM) 4, a print control section 5, a cartridge loading section 6, and a printing mechanical section 13. In addition, a cartridge 17 incorporating an A type font data memory 8 is detachably loaded into the cartridge loading section 6, as needed, to be operated under the control of the master control section 1. In such control of a plurality of fonts, development programs respectively corresponding to all the fonts are stored in the program memory 2 incorporated in the printer, provided that each program for developing font data into character patterns is defined as an inherent program by the data format of a font. If newly formed font data requires a complicated development program, the program memory 2 in the printer main body 15 is replaced with a corresponding memory.

In this conventional printer, however, if one of a plurality of cartridges respectively incorporating memories for storing a plurality of fonts having different data formats is to be supplied to the printer main body, since all the programs for developing font data into character patterns are stored as part of a microprogram in the printer main body, the memory space managed by the internal storage elements and the microprocessor is greatly increased in size. Consequently, the space used as a buffer and the space for storing programs associated with an extended control function are undesirably limited. In addition, when a new font is formed, and a printing operation is to be performed by the printer according to the font, the data format of the font must conform to one of the development programs stored beforehand in the printer main body. This makes it difficult to form font data.

SUMMARY OF THE INVENTION

It is an object of the present invention to provide a printer which can effectively use a memory space occupied by font development programs.

It is another object of the present invention to provide a printer which facilitates the formation of font data.

In order to achieve the above objects, according to the present invention, there is provided a printer using an external font cartridge, comprising a printer main body including an internal font data memory for storing internal font data, a program memory for storing at least an internal font development program, control means for performing control to generate print data on the basis of the internal font data stored in the internal font data memory and the internal font development program stored in the program memory, and printing means for printing the print data generated by the control means, and a cartridge including an external font data memory for storing external font data, and an external font development program memory for storing an external font development program, wherein when the cartridge is loaded into the printer main body, the control means selects the external font data memory and the external font development program memory in the cartridge, and performs control to generate print data corresponding to a designated character.

DESCRIPTION OF THE PREFERRED EMBODIMENT

Figure 1:
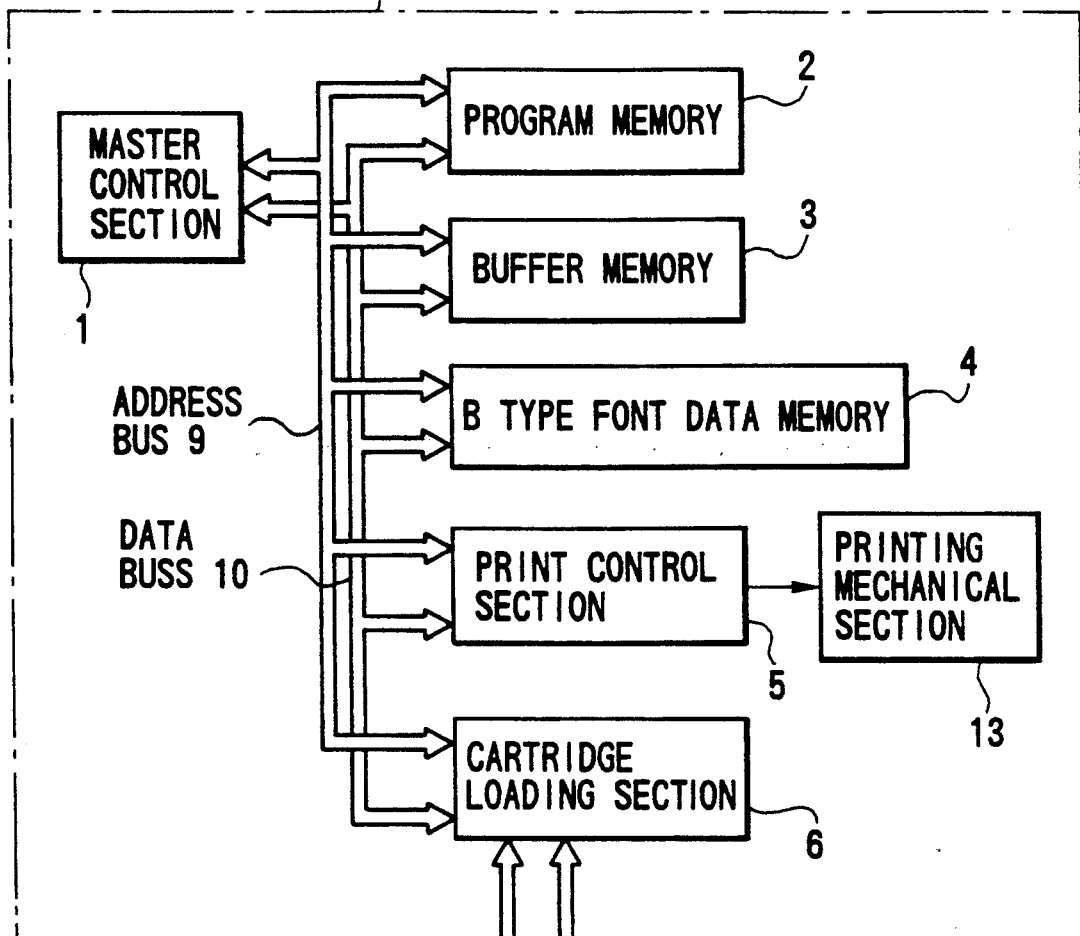
FIG. 1 is a block diagram showing a printer according to an embodiment of the present invention.
Figure 1:
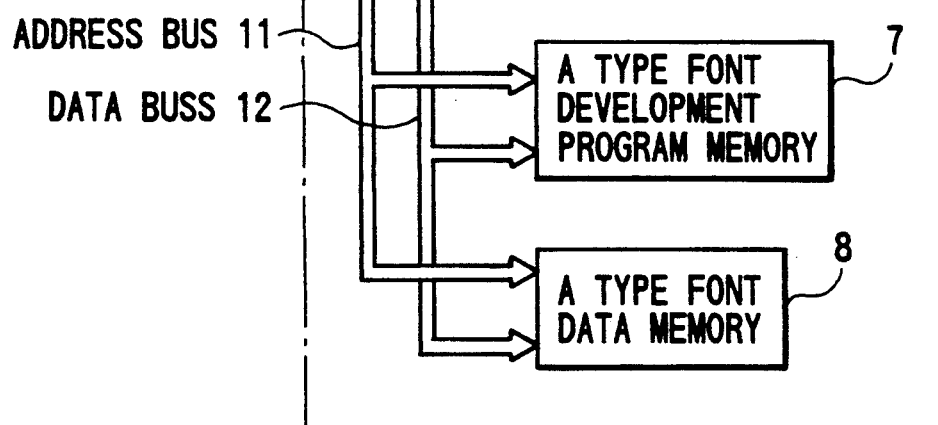

FIG. 1 is a block diagram showing a printer including a font control section according to an embodiment of the present invention. The embodiment in FIG. 1 has a printer main body 15 constituted by a master control section 1, a program memory (program ROM) 2, a buffer memory (buffer RAM) 3, a B type font data memory (print ROM) 4, a print control section 5, a cartridge loading section 6, and a printing mechanical section 13. In addition, this printer uses a cartridge 16 incorporating an A type font development program memory (program ROM) 7 and an A type font data memory (print ROM) 8. When this cartridge 16 is loaded into the cartridge loading section 6, address buses 9 and 11 and data buses 10 and 12 are connected to each other.

The master control section 1 has a function of controlling the overall printer, a function of identifying a loaded cartridge, and a function of down-loading a program from the A type font development program memory 7 in the cartridge 16. The master control section 1 operates in accordance with control programs written in the program ROM 2 and controls the respective components through the address bus 9 and the data bus 10. The program ROM 2 serves to store a microprogram for controlling the overall printer, and programs with two functions: a function of identifying a program from the A type font development program memory 7 in the cartridge 16 and switching the operation of the master control section 1 to the operation based on the A type font development program; and a function of reading B type font data from the B type font data memory 4 and outputting the image-developed data to the buffer memory 3, i.e., a B type font development program. The buffer memory 3 is designed to store developed character data in the form of images. The B type font data memory 4 stores data representing a B type font corresponding to a designated character and outputs this font data to the data bus 10 under the control of the master control section 1. The print control section 5 serves to receive print data through the data bus 10 and to supply the data to the printing mechanical section 13 so as to perform a printing operation. The cartridge loading section 6 is designed to receive the cartridge 16 and connect the address buses 11 and 12 and the data buses 9 and 10 to each other.

The A type font development program memory 7 is incorporated in the font cartridge 16 and is designed to operate the master control section 1. The master control section 1 which is operated in accordance with the A type font development program stored in the A type font development program memory 7 reads font data from the A type font data memory 8 through the address bus 9, the cartridge loading section 6, and the address bus 11, generates character patterns, and develops the resultant images in the buffer memory 3. That is, the A type font development program includes an auxiliary control sequence for the control programs stored in the program memory 2 of the printer main body 15.

An operation of the printer having the above-described arrangement will be described next.

In this embodiment, character patterns expressed by dot patterns are stored in the B type font data memory 4. When a printing operation is to be performed by using character patterns in the memory 4, the master control section 1 reads out the dot character patterns of characters to be printed from the memory 4 and develops them in the buffer memory 3 in accordance with a dot print program in the program memory 2. The character patterns in the buffer memory 3 are supplied to the printing mechanical section 13 under the control of the print control section 5, thus performing a printing operation.

Figure 2:
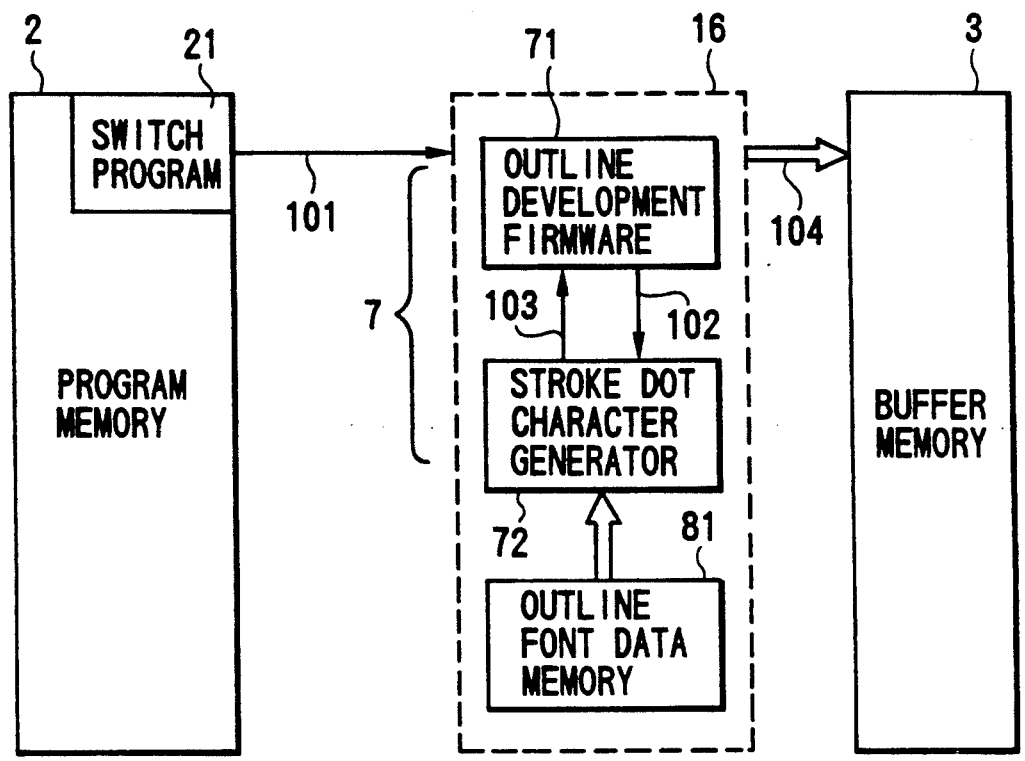
FIG. 2 is a block diagram showing a main part associated with an outline font printing operation.

FIG. 2 shows a main part associated with an outline font printing operation.

When the cartridge 16 is loaded into the printer main body 15, the cartridge loading section 6 detects this loading action and acknowledges it to the master control section 1. The master control section 1 starts a switch program 21 in the program memory 2 shown in FIG. 2 to switch the current mode to a printing mode using the program in the A type font development program memory 7.

Figure 3:
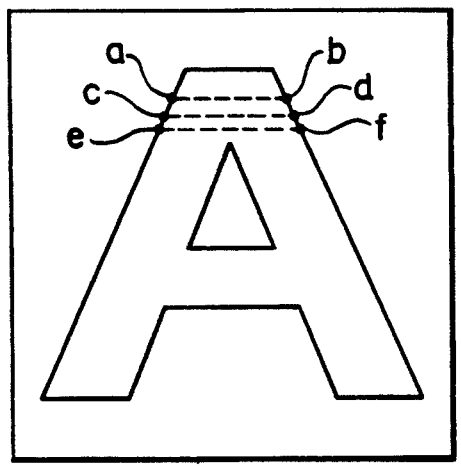
FIG. 3 is a view showing an example of outline font printing.
Figure 4:
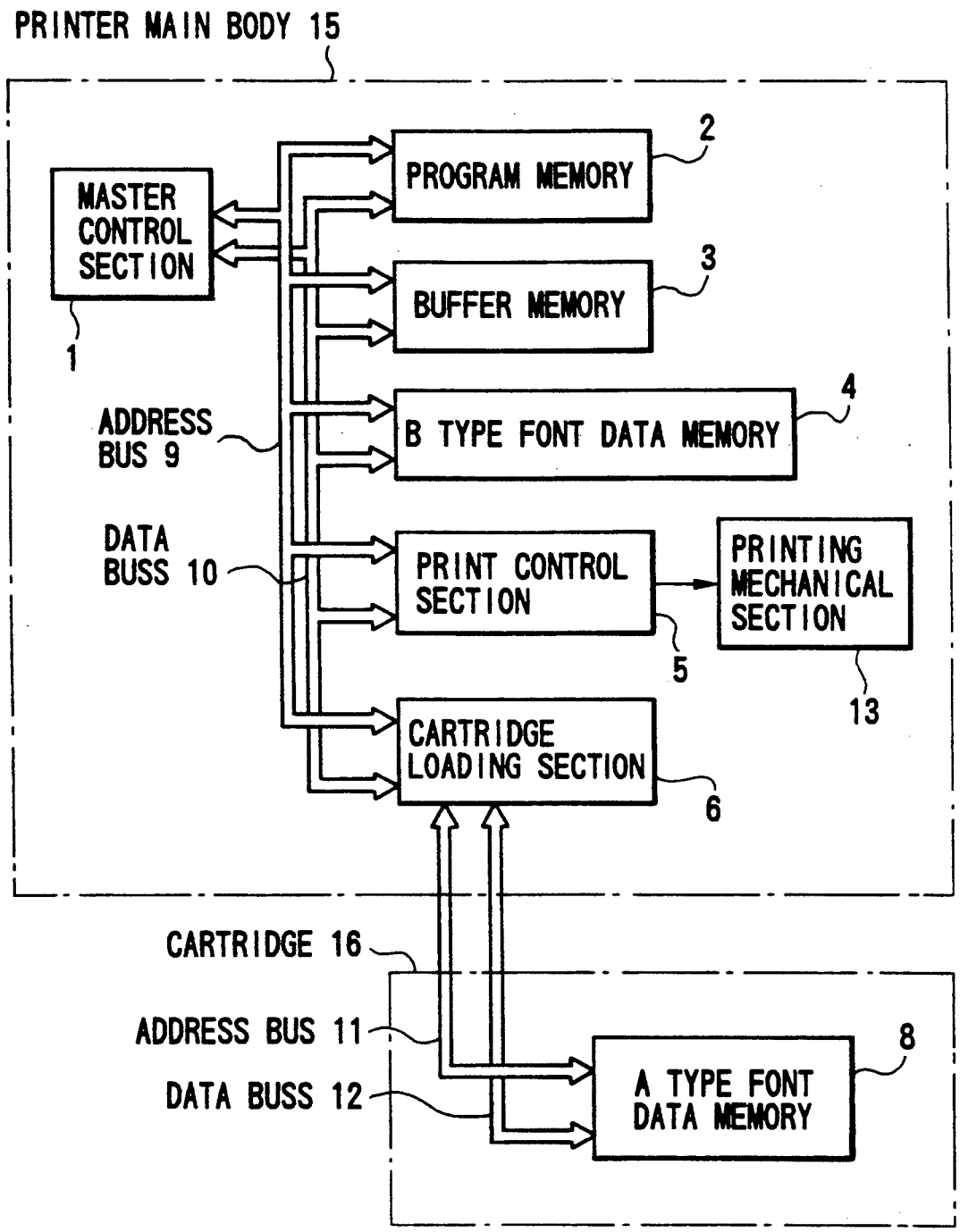
FIG. 4 is a block diagram showing a conventional printer.

The A type font data memory 8 serves to store character patterns expressed by outline vectors. The program in the development program memory 7 is constituted by outline development firmware (F/W) 71 and a stroke dot character generator (SDCG) 72. Data 101 consisting of, e.g., character size, magnification, character code, and character drawing rotational angle data is transferred from the program memory 2 of the printer main body 15 to the outline development firmware 71. Character data 102 based on the data 101 is then transferred from the outline development firmware 71 to the stroke dot character generator 72. The stroke dot character generator 72 reads outline font data from an outline font data memory 81 and sequentially supplies character outline coordinate data 103 such as coordinates a and b in FIG. 3 to the outline development firmware 71. The outline development firmware 71 forms a character in the buffer memory 3 by using data 104 based on the coordinates a and b, and the like. The contents of the buffer memory 3 are printed by the printing mechanical section 13 under the control of the print control section 5, thus performing an outline font printing without blurring. In this case, the outline development firmware 71 and the stroke dot character generator 72 serve as the font development program memory 7 in the cartridge 16, and the outline font data memory 81 serves as the font data memory 8.

In contrast to this, when the cartridge 16 is not loaded into the cartridge loading section 6 of the printer main body 15, the master control section 1 reads out font data corresponding to a designated character from the B type font data memory 4. Upon forming a character pattern on the basis of the B type font development program stored in the program memory 2, the master control section 1 causes the buffer memory 3 to store the pattern as image data through the data bus 10. The print control section 5 reads out the image data as print data from the buffer memory 3 at a predetermined timing. The printing mechanical section 13 prints the character in the B type font.

In the above-described embodiment, the master control section 1 recognizes loading of the cartridge 16 into the cartridge loading section 6 and automatically selects the A type font data memory 8 and the A type font development program memory 7. However, an external font in the cartridge 16 may be selected in accordance with font selection data set in a data setting section.

In addition, the printer main body 15 may further include a data setting section for setting font selection data, and the cartridge 16 may further include a C type font data memory for storing C type font data and a C type font development program memory for storing a C type font development program so that one of the A and C type external fonts in the cartridge 16 can be selected.

As has been described above, according to the present invention, the printer is designed to allow loading of a cartridge incorporating a ROM in which font data and a corresponding font development program are stored. Therefore, when a new font is to be formed, and a printing operation based on the font is to be performed by the printer, the data format of the new font need not conform to any of the font data formats set beforehand in the printer, thus facilitating a data forming operation. In addition, since no development program corresponding to the data format of an unused font need be included in microprogram stored in the printer main body, the memory space and the storage elements can be effectively used by the microprocessor in the printer main body.

What is claimed is:

1. A printer using an external font cartridge, comprising:
    a printer main body including an internal font data memory for storing internal font data, a program memory for storing at least an internal font development program, control means for performing control to generate print data on the basis of the internal font data stored in said internal font data memory and the internal font development program stored in said program memory, and printing means for printing the print data generated by said control means; and
    a cartridge including an external font data memory for storing external font data, and an external font development program memory for storing an external font development program,
    wherein when said cartridge is loaded into said printer main body, said control means selects said external font data memory and said external font development program memory in said cartridge, and performs control to generate print data corresponding to a designated character.

2. A printer according to claim 1, wherein said program memory further stores a control program for controlling overall operations of said printer, and a switch program for switching to the external font development program, and said control means performs a control operation in accordance with the control program and the switch program.

3. A printer according to claim 2, wherein the external font development program includes an auxiliary control sequence for the control program stored in said program memory, and said control means performs control to generate print data based on an external font in accordance with the auxiliary control sequence.

4. A printer according to claim 1, wherein, upon recognition of loading of said cartridge into said printer main body, said control means automatically selects said external font data memory and said external font development program memory and performs control to generate print data based on an external font.

5. A printer according to claim 1, wherein said printer main body further comprises a data setting section for setting selection data, and said control means selects said external font data memory and said external font development program memory in accordance with the data set in said data setting section, and performs control to generate print data based on an external font.

6. A printer according to claim 1, wherein said printer main body further comprising a cartridge loading section into which said cartridge is loaded, and buses in said printer main body are connected to buses in said cartridge through said cartridge loading section.

7. A printer using an external font cartridge, comprising:
- a printer main body including a program memory for storing a control program for overall printer operations, and a switch program for switching to an external font development program, control means for performing selection/control with respect to an external font on the basis of the control program and the switch program, and printing means for printing generated print data; and
- a cartridge including an external font data memory for storing external font data, and an external font development program memory for storing an external font development program,
- wherein when said cartridge is loaded into said printer main body, said control means performs control to generate print data corresponding to a designated character by using said external font data memory and said external font development program memory in said cartridge.

* * * * *